July 3, 1973    C. S. VINTON ET AL    3,743,692
METHOD FOR THE REMOVAL OF REFRACTORY POROUS SHAPES
FROM MATING FORMED MATERIALS
Filed June 19, 1972

United States Patent Office 3,743,692
Patented July 3, 1973

3,743,692
METHOD FOR THE REMOVAL OF REFRACTORY POROUS SHAPES FROM MATING FORMED MATERIALS
Clarence Samuel Vinton, Ann Arbor, and Warren Albert Rice, Dexter, Mich., assignors to Chemotronics International, Inc., Ann Arbor, Mich.
Filed June 19, 1972, Ser. No. 263,877
Int. Cl. B22d 29/00; B28b 13/06
U.S. Cl. 264—334     11 Claims

ABSTRACT OF THE DISCLOSURE

A method for the removal of a porous shape (including cores) with interconnected voids from a mating shape of formed material, (such as a casting) which has been prepared from the surfaces defined by the porous shape is described. A sealed chamber is provided to confine the porous shape and the mating shape. An explodable gaseous composition such as hydrogen or methane (natural gas) and oxygen or oxygen enriched air is introduced into voids in the porous shape in the sealed chamber at superatmospheric pressures and exploded so as to weaken the porous shape without damaging the mating shape. The weakened porous shape is readily removed from the mating formed material, preferably as finely divided particles. This result is produced because of the uniform effect of the explosion of the gaseous composition which was homogeneously distributed throughout the interconnected voids in the porous shape.

SUMMARY OF THE INVENTION

The present invention relates to a method for the removal of porous shapes, such as cores, from mating formed materials, such as castings. In particular, the interconnected voids forming the pores in the porous shape with the mating formed material are impregnated with an explodable gaseous composition in a sealed chamber and then the porous shape is weakened for removal from the mating shape by exploding the gaseous composition.

PRIOR ART

The art of casting or molding in making formed materials is well known and involves the conforming of a fluid and solidifiable composition to the surfaces defined by a mold whose cavity defines an object which is to be reproduced. See for instance "Metals Handbook," vol. 5 (1970) which particularly describes metal casting.

In casting, a pattern is used to produce the cavity or cavities in the mold and a core may be mounted within the cavity of the mold to produce hollow spaces in the casting. Patterns are removed before casting the object or can be eliminated during casting, such as shown in British Pat. No. 1,076,198. Cores are not removed until after casting is done. Many cores or molds in use are composed of bonded refractory particles having interconnected voids forming pores between the particles or they can be foamed to have such interconnected voids. An example of a form core is aerated plaster of Paris which is mixed in combination with surface active agents and water.

The removal of molds as well as cores from castings has long been accomplished by various mechanical means, including vibration, chipping, hammering and abrasive blasting, wherein the mold and/or core is broken. Usually various means have been used to mechanically erode away or hammer cores and a minimum cross-sectional area of core of above about one square inch (6.45 sq. cm.) is usually necessary to allow removal by these means. More specifically, explosive hammering of cores has been known to the prior art. In German Pat. No. 1,030,974, a method is described wherein a solid explosive charge is placed inside a hole provided in the center of a core inside a large casting and then detonated. The force of the explosion non-uniformly hammers and breaks the core (and probably sometimes the conforming or mating casting) so that the core can be removed. For molds, a similar process is described in U.S. Pat. No. 3,030,678 wherein shock waves are generated externally to a refractory particle mold by the explosion of a fluid above a mold-containing rectangular box with an open top and bottom (usually referred to as a casting flask) which supports the mold and casting and which causes the mold to be driven out of the bottom of the flask and broken against a barrier underneath the flask. The destruction of refractory particle molds by explosive hammering is thus easier than cores because they are not confined by a casting. In both methods the explosive material is concentrated in one externally exposed area of the mold or core prior to the explosion so that different portions of the mold or core are non-uniformly exposed to shock waves from the explosion. The result of the non-uniform explosure is the potential for damage to the casting and in any event cores inside the casting not reached by the externally generated shock waves such as blind holes or shielded sections are unaffected.

In U.S. Pat. No. 2,597,896, a mechanical type of method is described wherein steam at superatmospheric pressures is used to permeate a core which is provided inside a casting and then the external pressure of the steam is rapidly reduced, allowing the internal steam to expand and crack the core. This method appears to be advantageous because of its uniformity of treatment of the core; however, it is not believed to have achieved commercial success, probably because the forces achieved internally of the core are not sufficient to rapidly disintegrate the core without multiple exposures to the depressurization of the steam.

Chemical removal of cores is also known. Thus molten sodium hydroxide or sodium hydride at 800° F. to 1000° F. (427° to 538° C.) have been used to attack silica cores. Hydrofluoric acid has also been used for this purpose. Such materials are difficult and dangerous to use.

Sometimes cores are commercially removed from aluminum castings using heating at high temperatures for many hours to treat the metal and to make some of the core materials more friable. The cores are formulated with a heat decomposable material so that the cohesiveness of the core is reduced upon heating. Such decomposable materials are usually organic materials which degrade under oxidizing conditions. The decomposed volatilized organic materials create pollution problems which must be solved. These organic materials tend to make the core more readily erodable by the heated liquid metal during pouring and the castings therefore can be imperfect at the points of liquid metal impact.

With some metal castings (such as steel and iron castings) the shrinkage of the casting upon solidification and cooling compresses the core thereby tending to collapse and fracture the core. In many instances the core still has sufficient integrity or cohesiveness to make it difficult to remove from the casting. With some types of these cores further treatment by heating will have no significant useful effect. Because of the necessity to make cores collapsible to allow for removing the cores from castings, there has been a minimum core thickness requirement. The core has to have a minimum thickness to be strong enough to resist breaking, cracking and erosion on pouring.

It is therefore an object of the present invention to provide a method for the removal of porous shapes from mating or conforming formed materials including moldings and castings which is rapid and inexpensive and which does not adversely affect the casting or molding. Further, it is an object to provide a method which allows for using stronger porous shapes, particularly cores, preventing erosion, cracking and breaking and which will allow smaller casting or core thicknesses. Further still it is an object of the present invention to provide a method which allows the rapid and complete removal of cores internally provided in castings for holes, channels and other internal openings. Further still, it is an object of the present invention to provide a method for explosively removing cores and other porous shapes which is safe since it completely confines the treatment and thus pollutants can be prevented from entering the atmosphere. These and other objects will become increasingly apparent by reference to the following description and the drawing.

IN THE DRAWING

DETAILED DESCRIPTION

Figure 1:
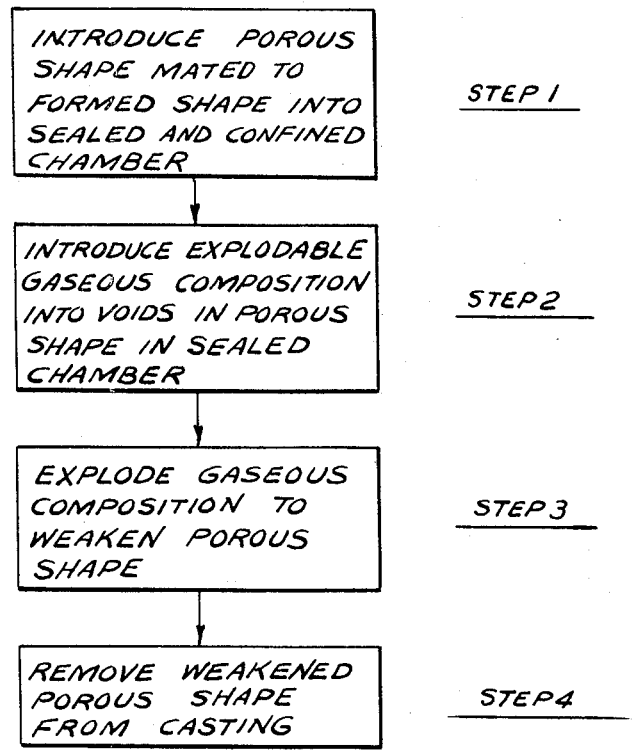
FIG. 1 shows block diagram illustrating the steps in the method of the present invention.

The method of the present invention as shown in FIG. 1 for the removal of a cohesive porous shape with interconnected voids from a mating formed material comprises: (a) confining the formed material with the mating porous shape in a sealed chamber; (b) providing an explodable gaseous composition in the sealed chamber at superatmospheric pressures such that it permeates the voids in the porous shape; (c) exploding the gaseous composition so that the cohesiveness of the porous shape is weakened by the action of the explosion and becomes removable without damage to the formed material; and (d) removing the weakened porous shape from the formed material. Preferably the cohesiveness of the porous shape is completely destroyed so that particles are produced which are easily removable from the formed material.

Porous shapes in the form of molds or cores for metal castings are normally formed from refractory particles (such as silica and zircon sands) which are bonded together with a binder. The binders can be composed of an organic material such as linseed oil or phenolformaldehyde polymer or an inorganic material such as sodium silicate, or cement. Various organic fillers (such as cereal, molasses, invert sugar or wood particles) can be used to make the cores more readily collapsible and/or removable by heat decomposition of the fillers. The cores are formed in a mold and cured. Molds are formed on a pattern. The curing of cores or molds can be for instance by air drying, heat, pressure and/or chemical reaction. In many instances the cores or molds are or can be readily made so as to be very porous or become porous upon curing of the binder such as by heating.

Preferably a casting is formed in mating or conforming contact with the porous shape. With metals this is accomplished by pouring the molten or liquid metal. Polymers or ceramics which are liquid but hardenable can be handled in the same way. Alternatively, particles of a formable material (as flowable particles) such as powder coating type epoxy resins can be molded and then cured. Preferably the formed material is non-porous, although they can also be porous providing the explosion does not destroy the structure of the formed material. All of these modifications for making formed materials are well known to those skilled in the art.

Once the formed material is mated in its hardened state with the porous shape, the problem of removal arises. Using the method of the present invention, the porous shaped and formed material combination is provided in a sealed chamber having closable conduit means leading to the space for providing and, after closing, exploding an explodable gaseous composition. Such sealable explosion chambers are known to the art and described for instance in U.S. Pat. Nos. 3,175,025, 3,456,047, 3,475,229 and 3,547,589 in the context of use in methods unrelated to the method of the present invention, in particular for deburring, for the reticulation of cellular materials and for the bonding of particles.

The explodable gaseous compositions, when introduced at superatmospheric pressures permeates or impregnates the voids in the porous shape. One way this is accomplished is by reducing the gas (air) pressure in the sealed chamber and in the porous shape with vacuum means and then introducing the explosive gas into the chamber. Alternatively, the explosive gaseous composition can be provided inside the porous shape by supplying it at superatmospheric pressure so that residual gas (air) in the sealed chamber is diluted by the explosive composition. The step of providing a vacuum in the chamber is preferably used only when the total volume of the air in the chamber and in the porous shape is so large in comparison to the volume of the explodable gas that serious dilution of the explodable gas, or non-uniformity of gas-air mixing occurs.

The explosive gaseous compositions include self-detonatable gaseous compositions such as acetylene as well as mixtures of oxidizer and oxidizable gaseous materials which explode. Included are, for instance, mixtures of hydrogen with oxygen or oxygen enriched air as well as hydrocarbons, preferably those which are at least partially gaseous under ambient conditions in the chamber, including lower alkanes (methane, ethane, propane, butane and higher homologs in a gaseous state) alkenes and alkynes, with oxygen or oxygen enriched air. Other oxidizer materials include gaseous halogens, such as chlorine and fluorine. The compositions can be heated to make them completely gaseous before introduction or the chamber containing the formed shape-porous shape combination can be heated to make them gaseous prior to exploding them and this can be done with the higher molecular weight hydrocarbons including higher alkanes such as gasoline. Other specific explosive gas combinations will readily occur to those skilled in the art, particularly from the disclosures of the patents relating to the sealed chambers.

There can be a considerable adjustment as to whether or not the gaseous explosion oxidizes or reduces the material adjacent to or accessible from the voids or pores. Thus, oxidizing conditions can be provided to aid in the destruction or decomposition of oxidizable binders or filler (both organic and inorganic), by using a molar excess of oxygen or other oxidizer over what is needed to provide the explosion. Reducing conditions can be used where the surfaces of the casting might be adversely affected, such as with some polymers.

The explosive gaseous compositions are provided in the chamber with the porous shape and formed shape combination at a pressure sufficient to cause an explosion which weakens the cohesiveness of the porous shape without damaging the casting; of course, the higher the pressure, the more explodable gaseous composition is provided per unit chamber volume. The friability or frangibility of the porous shape must therefore be greater than that of the formed shape under the explosive conditions in the porous shapes and sealed chamber. Thus, where a steel casting is the formed shape, very high pressures of the explodable gaseous composition can be used, particularly up to 1500 p.s.i.g. (103 atmospheres) or higher, since the explosion is less likely to harm the steel formed shape. Cast iron can be more brittle and more care must be taken. For brass, bronze and aluminum and polymer castings and the like, lower pressures are preferred. To prevent the destruction of a brittle ceramic casting, the porous shape usually has to be treated at relatively low pressure. The regulation of the pressure at which the explodable gaseous composition is provided and the strength of the porous shape can be widely varied and those conditions necessary can easily be determined by those skilled in the art.

The explosion is initiated in the explodable gaseous composition using conventional initiation or igniton devices such as spark gap devices. After the explosion, the porous shape and casting combination is removed from the chamber. Usually and preferably the porous shape has been reduced to particles by the explosion which are readily removed such as by gravity flow, vacuum cleaning, mild shaking or vibration or air flow directed at the casting. In some instances, such as when the casting is delicate, the porous shape is only weakened sufficiently to use various conventional mechanical or chemical means, such as thermal degradation of the binder for core removal, although this is not preferred. The chamber can easily be cleaned of loose core material by vacuum or the like. All of these variations will be obvious to those skilled in the art.

An optional additional step in the method of the present invention which is used with castings having internal porous shapes or cores to be removed is to pack them in particles of a material, such as sand or the like. This prevents movement of the casting during the explosion and also helps to prevent fusing of the core material at exterior surfaces in contact with the explosion. The use of this step is optional and is preferred when very high explosive gaseous composition pressures are being used with cored castings, which can fuse some of the core material at its exterior surfaces.

The following are illustrative examples of the method of the present invention.

EXAMPLE 1

A grey iron casting 10 (FIG. 2) was prepared with a core 11 composed of by weight 3.3 percent of a 40° Baumé sodium silicate solution (2.38:1 $SiO_2$ to $Na_2O$); 1.7 percent kaolin; 1.7 percent alumina (400 mesh); 2 percent 40° Baumé invert sugar and the balance silica sand (80 mesh American Foundryman's Society or AFS). The core 11 had been cured by being subjected to carbon dioxide gas treatment prior to casting. The casting 10 was in the shape of a hollow cylinder (about 5 inches in diameter (12.7 cm.) and 6 inches (15.2 cm.) along with ½ inch (1.27 cm.) thick walls) with bottle necks 12 opened (1½ inch (3.8 cm.) in diameter) at either end. The core 11 was inside the casting 10 (4 inches (10.2 cm.) in diameter and 5 inches (12.7 cm.) long with 1½ (3.8 cm.) inch diameter cylindrical extensions at either end) and was accessible from the outside of the casting 10 only through the openings in the necks 12. This composition produces a relatively strong porous core 11 where the spaces occupied by the invert sugar which is destroyed during casting 10 makes the core 11 more readily compressible upon shrinkage from cooling of the casting 10.

Figure 2:
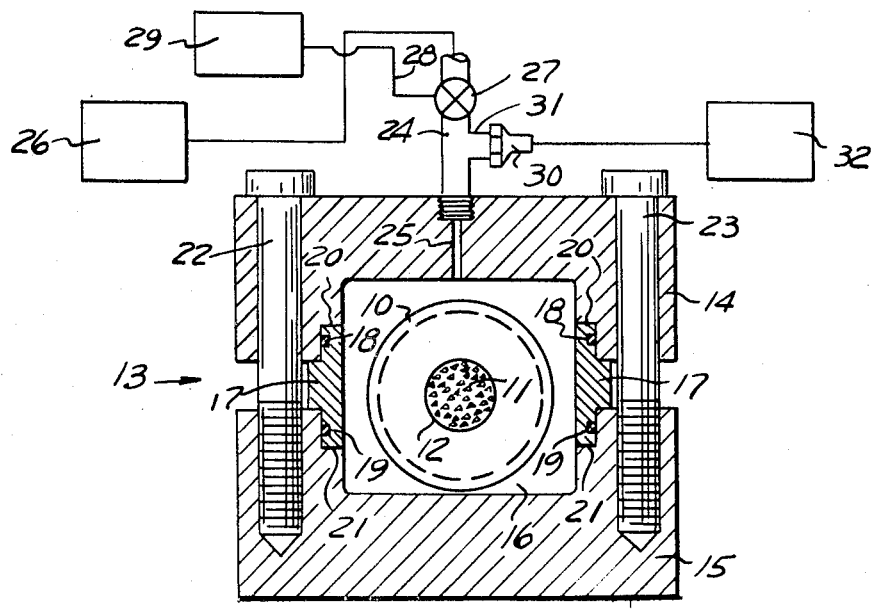
FIG. 2 illustrates one type of chamber used in the method of the present invention as diagramed in FIG. 1 for confining the explosion of a gaseous composition inside the voids of the porous shape conforming to the casting.

A cylindrical steel chamber 13 was provided as shown in cross-section in FIG. 2, top half 14 and bottom half 15 forming a sealed space 16 (measuring 5¼ inches (13.34 cm.) high by 7½ inches (19.05 cm.) in diameter) with a spacer ring 17 interposed between the halves 14 and 15. The outside of ring 17 was provided with grooves into which rubber O rings 18 and 19 fitted so as to seal with steps 20 and 21 on the halves 14 and 15 conforming to the outside edges of the ring 17. The halves 14 and 15 were secured together by twelve 1½ inch (3.8 cm.) diameter threaded bolts 22 and 23 extending through the top half 14 and threaded into the bottom half 15 on the outside of the ring 17 and were inserted and tightened after the casting 10 was provided in the space 16. A steel conduit 24 threaded into the top half 14 was provided with a conduit 25 leading into the space 16 for introducing an explodable gaseous composition from an external source 26 into the space 16 and externally connected to a two-way valve 27 for closing the conduit 24 after the introduction of the explodable gas composition. A second conduit 28 can also be provided for optionally producing a vacuum using a pump 29 in the space 16 prior to introducing the gaseous composition. A spark plug 30 was mounted on a hollow fitting 31 provided in the conduit 24 to provide a spark in the conduit 24. The plug 30 was connected to an electrical discharge unit 32 for causing the plug 30 to spark.

A mixture of hydrogen and oxygen gas in a 2:1 molar (which in this case is the same as volume) ratio was introduced through valve 27 and conduit 24 into the space 16 at a pressure of 250 p.s.i.g. (18.1 atmospheres absolute) and the valve 27 closed. A spark was initiated by the plug 30 which ignited the gas mixture causing an explosion.

After the explosion, the top half 14 of the chamber 13 was opened and the casting 10 was removed. It was found that a disc of sand ⅛ inch (0.3 cm.) thick and 1½ inches (3.81 cm.) in diameter was fused in the openings in the necks 12 of the casting 10 because of direct exposure to the explosion and that the balance of the core 11 material was reduced to individual sand grains which easily flowed out of the casting 10.

In order to eliminate the fused discs in the openings in the necks 12 of the casting 10, the casting 10 was packed in a refractory granular particulate medium, usually sand. In this manner the core 11 was not exposed to the unshielded effects of the explosion.

EXAMPLE 2

The method of Example 1 was identically repeated except that the casting 10 was packed in silica sand (80 mesh AFS). The result was the same as in Example 1, except that there were no fused discs in the necks 12.

EXAMPLE 3

The method of Example 2 was repeated except that a sodium silicate binder (3.3 percent by weight of a 40° Baumé solution (2.38:1 $SiO_2$ to $Na_2O$) and the balance silica sand (80 mesh AFS) cured by carbon dioxide gas was used. It was found that the core 11 was easily disintegrated by conventional shaking to produce the sand particles.

To give an indication of the effectiveness of the method, the strengths of the core 11 were determined at various steps. This showed that very high strength cores 11 could be greatly weakened by the method of the present invention.

EXAMPLE 4

The method of Example 3 was repeated at 450 p.s.i.g. (31.6 atmospheres absolute) with a core 11 having a compressive green strength of 200 p.s.i. (14.0 kilograms per square centimeter) and having a retained strength after casting and cooling of 400 p.s.i. (28.0 kilograms per square centimeter). The core 11 in the casting 10 was subjected to the explosion. It was found the core 11 had a compressive strength of 20 p.s.i. (1.4 kilograms per square centimeter). Thus the method achieves a 20 fold decrease in the core 11 strength.

EXAMPLE 5

The method of Example 2 was repeated except the core 11 was made of cement (11½ percent by weight portland cement with 6½ percent by weight water) mixed with silica sand (80 mesh AFS) which set for 72 hours. It was found that the core 11 was disintegrated by shaking to produce the sand particles.

EXAMPLE 6

The method of Example 2 was repeated in the same apparatus. In this case the casting was made of aluminum and was in the form of a cylinder 2 inches (5.1 cm.) long by 1½ inch (3.8 cm.) in diameter. A mold was formed of porous gypsum (plaster) in the form of a cavity which was then baked to dry it at 450° F. (232° C.) for 1 hour. The fins to be formed were 0.3 inch (0.76 cm.) from the central core to the outside diameter of 1½ inches (3.8 cm.), thereby having a root diameter of 0.9 inch. (2.29 cm.). The aluminum was cast in the mold and cooled. The mold then was placed in the chamber 13 in Example 2. After evacuation of the chamber to 10 torr, a mixture of hydrogen and oxygen in a 2:1 molar ratio was provided in the sealed space 16 at 50 p.s.i.g. (4.4 atmospheres absolute) and ignited. The chamber was evacuated to reduce air dilution of the explodable gas mixture. The chamber 13 was opened and it was found that the plaster was reduced to a powder which was easily separated from the casting.

EXAMPLE 7

The process of Example 1 was repeated with an aluminum pneumatic control valve body having multiple internal intricate air flow passages to accommodate shutoff and check valving in parallel and filled with a core material composed of thermosetting phenolformaldehyde resin (3% by weight) and the balance silica sand (80 mesh AFS). There was no cereal used as a filler. The core 11 had been cured for 15 minutes at 400° F. (204° C.) in a core box. The casting 10 and core 11 were placed in a sealed chamber 13 pressurized to 200 p.s.i.g. (14.6 atmospheres absolute) without previous evacuation of the chamber 13 and with a 2:1 molar ratio of hydrogen and oxygen (stoichiometric) and ignited. The chamber 13 was opened and it was found that the core 11 was almost completely reduced to the sand particles which were easily removed from the inside of the valve body with an air stream. Where the core 11 sand surfaces were exposed directly to the explosion, there was some fusing of the sand particles which was easily removed. In contrast, for this valve body normally the casting and core are heated for 12 hours at 900° F. (482° C.) to anneal the casting and thermally degrade the core 11 binder, after which the core 11 is reduced to the sand particles which are removed by mechanical means.

EXAMPLE 8

The method of Example 7 was repeated except that the valve body was packed in silica sand (80 mesh AFS). It was found that the surfaces of the core in contact with the sand were not fused at all.

EXAMPLE 9

The method of Example 7 was repeated with a large pneumatic aluminum control valve body with multiple internal passages and a core formed of 1½% linseed oil (core oil) with 1% corn flour and the balance sand. The sand was one half bank sand (95 AFS) and the other half sharp silica sand (50 AFS). The core was baked for 3 hours at 400° F. (204° C.). It was found that the core was again reduced to sand particles and easily removed with an air stream.

EXAMPLE 10

The method of Example 2 was repeated except that the chamber 13 was not evacuated and a mixture of methane and oxygen in a 0.4:1 molar ratio was introduced in the chamber at a pressure of 150 p.s.i.g. (11.2 atmospheres absolute). The core 11 was completely disintegrated into the sand particles.

EXAMPLE 11

The method of Example 3 was repeated except that hexane and oxygen in a 0.1:1 molar ratio were individually charged into the chamber 13 with the oxygen at 120 p.s.i.g. (9.2 atmospheres absolute) and allowed to equilibrate. The core 11 disintegrated and shook out easily.

EXAMPLE 12

The method of Example 2 was repeated except that the mixture of hydrogen and oxygen had a 1:1 molar ratio. The results were similar.

EXAMPLE 13

The method of Example 2 was repeated with a glass molding which had been molded of $\frac{1}{16}$ inch (0.16 cm.) glass spheres containing 5 percent 52° Baumé sodium silicate (2.4:1 $SiO_2$ to $Na_2O$) in a mold cavity 1 inch (2.54 cm.) deep and 2 inches (5.0 cm.) in diameter. The mold material was 80 mesh AFS sand bonded with the 3.3 percent 40° Baumé sodium silicate. The mold containing the glass shot was heated to 1800° F. (990° C.) to fuse the glass shot-sodium silicate mix. The porous mold and nonporous molding were allowed to cool and placed in the sealed chamber 13, evacuated and charged to 225 p.s.i.g. (16.3 atmospheres absolute) with a mixture of hydrogen and oxygen in a 2:1 molar ratio and ignited. The chamber 13 was opened and it was found that the mold was completely disintegrated and glass molding was removed intact.

EXAMPLE 14

The method of Example 2 was repeated with a curable urethane elastomer casting having an internal hole 1 inch (2.54 cm.) in diameter and 2½ inches (6.4 cm.) deep. The core was made of 80 mesh AFS silica sand bonded with 2 percent 40° Baumé sodium silicate (2.38:1 $SiO_2$ to $Na_2O$). The liquid urethane resin was mixed wtih conventional curing agents and then cast around the core 11 and then the casting 10 was cured for 16 hrs. at ambient temperatures. The casting 10 was placed in a sealed chamber 13, evacuated, pressured to 200 p.s.i.g. (14.6 atmospheres absolute) with a mixture of hydrogen and oxygen in a 2:1 molar ratio and ignited. The casting 10 was removed from the chamber 13 and it was found that the core 11 was completely disintegrated and poured out easily when the casting 10 was inverted.

As will be appreciated, by using the method of the present invention, the porous shapes or cores can be made stronger than previously thought possible with the result that smaller cross-section cavities can be achieved with fewer casting rejections. Further, it is possible to reclaim the particulate aggregate for making the porous shapes, particularly the sand.

We claim:

1. The method for the removal of a cohesive porous shape in the form of a mold or core used for molding or casting from a mating molded or cast formed material which comprises:
    (a) providing a refractory gas permeable shape with interconnected voids forming the pores which is more frangible than the mating formed material and which is cohesive after casting or molding;
    (b) confining the porous shape with the mating formed material in a sealed chamber;
    (c) providing an explodable gaseous composition in the sealed chamber at superatmospheric pressures such that it permeates the interconnected voids in the porous shape;
    (d) exploding the gaseous composition so that the cohesiveness of the porous shape is weakened by the action of the explosion within the voids in the porous shape and becomes removable without damage to the formed material; and
    (e) removing the weakened porous shape form the formed material.

2. The method of claim 1 wherein the explosive composition destroys the cohesiveness of the porous shape so as to produce particles which are removable from the formed material.

3. The method of claim 1 wherein the explodable gaseous composition is introduced after evacuating the chamber and porous shape of some of the entrapped air.

4. The method of claim 1 wherein the mating formed material and porous shape are packed in loose particles.

5. The method of claim 1 wherein the explodable gaseous composition is provided as an explodable mixture of oxidizer and oxidizable gas.

6. The method of claim 5 wherein the explodable gaseous composition is provided as a mixture of hydrogen and oxygen.

7. The method of claim 1 wherein the explodable gaseous composition is provided by a mixture of a gaseous hydrocarbon and oxygen.

8. The method of claim 1 wherein the weakened porous shape is removed mechanically.

9. The method of claim 1 wherein the weakened porous shape is removed chemically.

10. The method of claim 1 wherein oxidizing conditions are maintained during the explosion such that part of the porous shape is oxidized.

11. The method of claim 10 wherein the porous shape contains oxidizable material which is oxidized.

References Cited
UNITED STATES PATENTS

| | | | |
|---|---|---|---|
| 2,597,896 | 5/1952 | Oster | 164—132 X |
| 3,030,678 | 4/1962 | Huston et al. | 164—48 |
| 3,456,047 | 7/1969 | Vinton et al. | 264—80 |

FOREIGN PATENTS

| | | | |
|---|---|---|---|
| 1,030,974 | 11/1958 | Germany | 164—48 |

ROBERT D. BALDWIN, Primary Examiner

U.S. Cl. X.R.

65—18, 68, 32, 157; 134—17; 164—48, 132